United States Patent
Hahn et al.

(10) Patent No.: US 12,429,899 B2
(45) Date of Patent: Sep. 30, 2025

(54) SAFE DIGITAL INPUT CIRCUIT FOR DECOUPLING DIAGNOSTIC OUTPUTS

(71) Applicant: WAGO Verwaltungsgesellschaft mit beschraenkter Haftung, Minden (DE)

(72) Inventors: Alexander Hahn, Espelkamp (DE); Torsten Meyer, Penningsehl (DE); Christian Voss, Minden (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 154 days.

(21) Appl. No.: 18/369,678

(22) Filed: Sep. 18, 2023

(65) Prior Publication Data
US 2024/0094761 A1 Mar. 21, 2024

(30) Foreign Application Priority Data
Sep. 20, 2022 (DE) .................... 20 2022 105 284.0

(51) Int. Cl.
*G06F 1/04* (2006.01)
*G06F 13/36* (2006.01)

(52) U.S. Cl.
CPC ............ *G06F 1/04* (2013.01); *G06F 13/36* (2013.01); *G06F 2213/40* (2013.01)

(58) Field of Classification Search
CPC ......... G06F 1/04; G06F 13/36; G06F 2213/40
See application file for complete search history.

(56) References Cited

U.S. PATENT DOCUMENTS

2002/0180278 A1\* 12/2002 Veil .......................... G05B 9/02
307/326

FOREIGN PATENT DOCUMENTS

DE  10033073 A1  8/2001
JP  2009094982 A  \* 4/2009

\* cited by examiner

*Primary Examiner* — Lincoln D Donovan
*Assistant Examiner* — James G Yeaman
(74) *Attorney, Agent, or Firm* — Muncy, Geissler, Olds & Lowe, P.C.

(57) ABSTRACT

A safe digital input circuit with a first input and a second input for reading in a sensor signal with a clock generator to generate a clock signal is shown. The safe digital input circuit includes a first clock output and a second clock output for connecting sensors to safely shut down a plant. A first and a second signal line are connected to a clock generator output of the clock generator to forward the clock signal to the first and second clock output.

10 Claims, 5 Drawing Sheets

SAFE DIGITAL INPUT CIRCUIT FOR DECOUPLING DIAGNOSTIC OUTPUTS

This nonprovisional application claims priority under 35 U.S.C. § 119(a) to German Patent Application No. 20 2022 105 284.0, which was filed in Germany on Sep. 20, 2022, and which is herein incorporated by reference.

BACKGROUND OF THE INVENTION

Field of the Invention

The present invention relates to a safe digital input circuit for fault detection, in particular of interference voltages on lines as well as short and cross-circuits at the inputs of a safe digital input circuit.

Description of the Background Art

From the state of the art, it is known in the field of safety technology to integrate sensors, such as emergency stop switches or door switches for locking dangerous areas, into processes in a safety-oriented manner and to monitor them for proper functioning. In DE 100 33 073 A1, sensors are connected to a safety controller according to a 3-wire or a 4-wire scheme.

In the 3-wire scheme, a common clock line leads from the clock output of the safety controller to the sensors. The sensors switch a common clock signal on two lines via two separate switching elements. The clock signals are then forwarded via two separate lines to inputs of the safety controller for further processing. However, a pure cross-circuit between the two inputs cannot be detected with the 3-wire scheme. However, if connecting cables are laid protected in the control cabinet or in parts of the system, it can be assumed that a fault (short circuit, cross-circuit, etc.) is highly unlikely. In these cases, a so-called fault exclusion can be assumed for the connecting cable and the 3-wire scheme can be used.

In the 4-wire scheme, two independent clock signals are forwarded via the separate switching elements of a sensor and forwarded in each case via two lines to the inputs of a safety controller.

SUMMARY OF THE INVENTION

It is therefore an object of the invention to create a module that is as improved as possible, in particular a safe digital input module for connecting contact-based switches, such as emergency stop switches.

The safe digital input circuit according to the invention is equipped with at least one first and one second input and at least one first clock output and a second clock output for connecting sensors, in particular contact-based switches, such as emergency stop switches for safely shutting down a system. The safe digital input circuit also includes a clock generator for generating a clock signal with a first signal line connected to the clock generator output of the clock generator to forward the clock signal to the first clock output and a second signal line at the clock generator output of the clock generator, which is connected to forward the clock signal to the second clock output, wherein a first diode is interposed in the first signal line between the clock generator output and the first clock output and a second diode is interposed in the second signal line between the clock generator output and the second clock output, so that a feedback effect on the respective other signal line (S1, S2) caused by an interference voltage (60, 61) is prevented.

The at least two inputs of the safe digital input circuit are set up to detect a voltage and, above a specified voltage threshold, to pass on a digital value corresponding to a binary "1" or, below a specified voltage threshold, a digital value corresponding to a binary "0" to a microcontroller (µC). The µC is set up to process the signal and output it at an output of the safe digital input circuit.

The clock generator of the safe digital input circuit can preferably be a semiconductor device controlled by the µC, wherein, for example, a 24V voltage is permanently applied to the semiconductor device (clock generator input) on the input side and the output of the semiconductor element (clock generator output) is switched on or off in a clocked manner according to the control of the µC. As a result, a clock signal with a defined time duration t can be generated at the clock generator output. In addition to the diodes connected between the clock generator output and the clock outputs, semiconductor devices such as FETs or transistors can also be used. The evaluation of the clock signals generated by the clock generator are recognized as input signals at the inputs of the safe digital input circuit when the sensor switches are closed. If a voltage is applied to one of the inputs of the safe digital input circuit outside the defined time period t of the clock signal, an interference voltage applied to the lines or to the sensor can be assumed to be present. This can be a safety-critical incident that triggers a safety response. Interference voltages can be positive as well as negative. As a rule, however, a negative interference voltage is excluded for reasons of installation, so that a direct short circuit at the clock output can be excluded.

The anode of the first diode and the anode of the second diode can be connected together to the clock generator output, so that a current flow caused by a positive interference voltage applied to the clock output is blocked.

This has the advantage that only one clock output of the clock generator is required. Furthermore, the clock signal is duplicated and is available at both clock outputs.

Advantageously, the diodes can be unidirectional suppressor diodes (transient voltage suppressors), which can protect the clock outputs in particular from excessively high voltage pulses from the outside, for example by EMC pulses.

The first diode and the second diode can be Zener diodes. The advantage of using Zener diodes is that if the voltage is too high, they become conductive and can absorb energy to protect the other circuit components.

The cathode of the first diode can be connected to the first clock output and the cathode of the second diode is connected to the second clock output. The arrangement of the diodes has the advantage that if there is an interference voltage at one of the two inputs or at their lines or at the sensor, no feedback effect on the other clock output or input is caused. Thus, a fault due to an interference voltage is granular, i.e., can be resolved separately for each individual input.

The safe digital input circuit can include a microcontroller set up to control the clock generator. The clock signal of the clock generator can advantageously be derived from a working cycle of the microcontroller. Among other things, this has the advantage that no additional clock generators are required to generate the clock signal.

The microcontroller of the safe digital input circuit can be set up to detect an input signal based on the clock signal and generate process data based on the input signal and mark the process data as valid or invalid.

Due to the simultaneous control of the clock generator and the evaluation logic for the input signal in the microcontroller, a fast evaluation and thus a short reaction time to interference signals is possible.

The microcontroller of the safe digital input circuit can be set up to output an error message to a data interface based on an interference signal. For example, the error message may contain information about the fault, specifying the input and the connected sensor. This is particularly advantageous for the localization of the interference.

The microcontroller of the safe digital input circuit can also be set up to detect the interference signal based on a deviation from the clock signal.

A safe digital input module can include a safe digital input circuit, wherein the safe digital input module is set up to output the process data or error message to a sub bus.

A decentralized system can include a fieldbus coupler and at least one safe digital input module, wherein the safe digital input module can be connected to the fieldbus coupler and is set up to communicate with the fieldbus coupler via a sub bus, wherein the fieldbus coupler is also set up to receive the process data or error message and output it to a fieldbus and/or operating device.

An automation system can include a controller and a decentralized system, wherein the controller is set up to receive the process data and/or error message via the fieldbus and wherein the controller is also set up to process the process data and/or error message.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
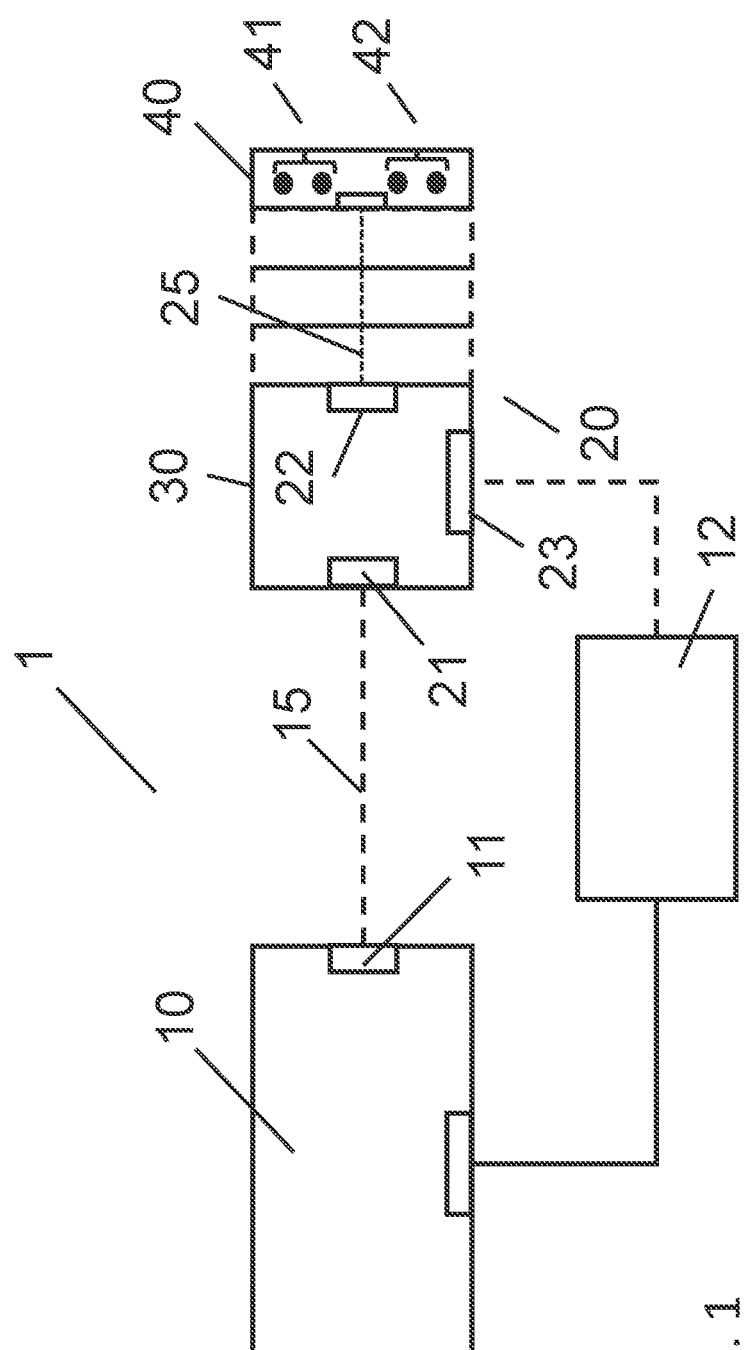
FIG. 1 shows a block diagram of an automation system with a decentralized device and a safe digital input module with clock outputs and inputs, for example, for connecting sensors.

For example, an automation system has a fieldbus head and input and/or output modules or a combination of input and output modules (generally I/O modules). To control the automation system, the I/O modules can pick up digital or analog signals from sensors and output them to actuators via their outputs.

The fieldbus head is connected to a higher-level controller via a fieldbus. To connect the I/O modules, a fieldbus head in the form of a fieldbus coupler or a fieldbus controller can communicatively couple the I/O modules to the fieldbus. In many cases, the communication between the I/O modules and the fieldbus head is implemented via a proprietary sub bus. The fieldbus head is suitable for adapting the data to be transmitted via the sub bus according to the requirements of the fieldbus and, if necessary, changing it for a higher-level controller. For this purpose, the fieldbus head can have an application in the form of a control program.

In automation technology, sensors record physical quantities (e.g., of an environment) and convert them into electrical signals. The electrical signals can be transmitted to a control system (PLC) for evaluation. A microcontroller in the controller processes the signals with the help of a control program, e.g., to control actuators that execute a process step. The process step can be a sub-process as part of an overall process. It is necessary to check not only the correct transmission of the electrical signals from time to time or cyclically to ensure proper functioning, but also the behavior of the process or system during commissioning, replacement, troubleshooting or malfunction. This is especially true in safety-critical areas where processes can endanger people and machines.

In the case of safety-critical processes, such as the use of emergency stop switches or door switches for safety gate interlocking, sensors, among other things, must also be integrated into the process and monitored in a safety-oriented manner. This can be ensured by input circuits that meet increased requirements, especially in safety-critical areas, for example when regularly checking the connection cable of a sensor (emergency stop switches or door switches) for short circuits or line breaks at the inputs of the input circuits. In order to ensure proper functioning, faults on the sensor connection cables must be detected in good time. If an initial start-up has already taken place, it is assumed that reverse polarity can be almost excluded with fixed wiring. Thus, negative interference voltage is unlikely.

A line break means that a "0" is read in at the input of the safe input circuit. It is not possible to switch on an actuator, such as a machine, in this safe state.

The signals from the emergency stop switches or door switches for safety gate interlocking can be recorded as sensor signals or, more generally, as input signals. The input signal can be present in digital form ("1" or "0"), which is represented, for example, by an applied voltage 24V="1", 0V="0"), in which, starting from a predetermined voltage threshold, a digital "1" is passed, and below a predetermined voltage threshold, a digital "0" is passed. This digital value can be transferred to a microcontroller (µC), for example in a controller, for further evaluation. If safety-relevant processes are controlled, safety-related requirements must also be taken into account. Therefore, special safety requirements for hardware and software must be met.

In order to meet the safety requirements, in addition to a safety controller for processing the input signals, safe digital input modules are used to record the input signals. Unlike the non-safe digital input modules, the safe digital input modules can have safe digital input circuits. For example, the safe digital input circuits have clock outputs that are set up to check the connecting cables of sensors, in particular to detect possible interference voltages. The clock signals are preferably generated by the safe digital input circuit itself and read back and evaluated by the inputs of the safe digital input circuit during a test phase.

FIG. 1 shows an automation system (1) with a higher-level controller (10) and a decentralized device (20). The higher-level controller (1) is connected to a connection interface (11) via a fieldbus (15) to the decentralized device (20). The decentralized device (20) can include a fieldbus head (30) and at least one safe digital input module (40). The safe digital input module (40) is preferably mechanically connected to the fieldbus head (30). The electrical supply of the safe digital input module (40) with energy can be provided by the fieldbus head (30). The data transfer from the fieldbus head (30) to the safe digital input module (40), and vice versa from the safe digital input module (40) to the fieldbus head (30), is controlled by a sub bus (25), which is preferably controlled by the fieldbus head (30). The exchanged data can be referred to as the process data.

For example, the safe digital input module (40) has a safe digital input circuit (48) with options for connecting sensors to the clock outputs (41a, 41b) and to the digital inputs (42a, 42b). An operating computer (12) may be set up for programming or configuring the automation system (1) or the decentralized device (20). The operating computer (12) is connected to the higher-level controller (10) or to the decentralized device (20) via a service interface (23), which is designed, for example, as a USB interface.

Figure 2A:
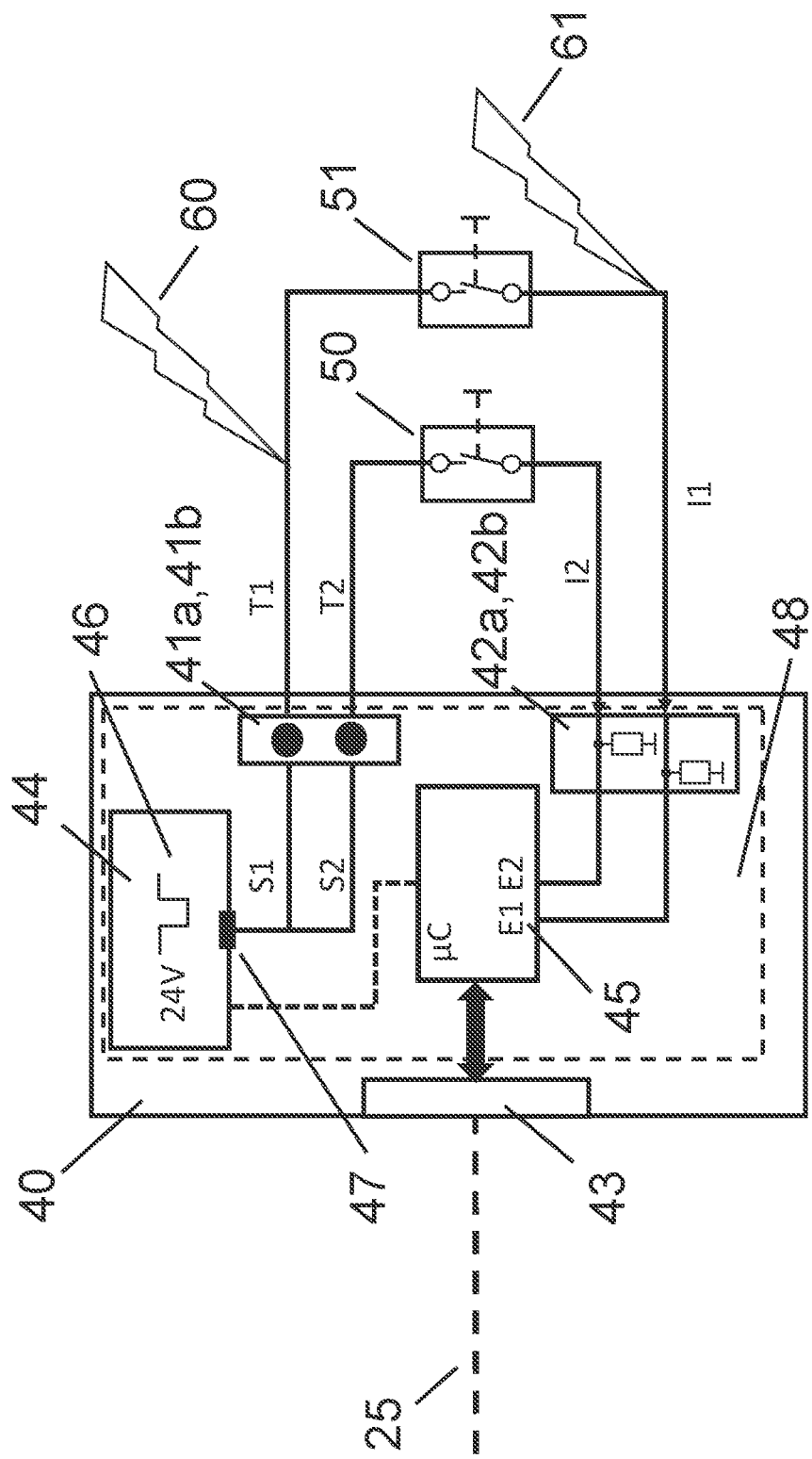
FIG. 2a shows a block diagram of a safe digital input module with a data interface for data connection with, for example, a sub bus and clock outputs and inputs for connecting sensors according to the conventional art in a first switching state under the influence of an interference voltage.

FIG. 2a shows a conventional safe digital input module (40) with a safe digital input circuit (48). The safe digital input module (40) has a data interface (43) for transmitting process data on a sub bus (25). The data to be transmitted can be input process data, output process data or control values for parameterizing the safe digital input module, such as filter data, filter times, amplification factors (offset and gain), diagnostic data, voltage thresholds, etc.

The clock outputs (41a, 41b) of the safe digital input circuit are set up for the connection of sensors, in particular an emergency stop switch (50, 51), wherein the inputs (42a, 42b) are set up to read in the clock signal (T) output at the clock outputs (41a, 41b). The clock generator (44) can preferably be controlled by the µP (45). Two signal lines (S1, S2) are connected to the clock generator output (47), each of which is directly connected to a clock output (41a, 41b). The evaluation of the input signals (I1, I2) read in via the inputs (42a, 42b) can also be realized by the µP (45). This has the advantage that a fast analysis of the input signals (I1, I2) can be guaranteed.

The emergency stop switches (50, 51) are shown in FIG. 2a in the open switch position. In this case, there may be a safety-related incident, for example, a safety gate is open and no clock signals (T) can be measured at the inputs (42a, 42b). In this case, the automation system (1) or the relevant section of the automation system (1) must be brought into the safe state and secured before being restarted. An interference voltage (60) on the clock lines cannot be detected. However, an interference voltage at the inputs can be detected.

Figure 2B:
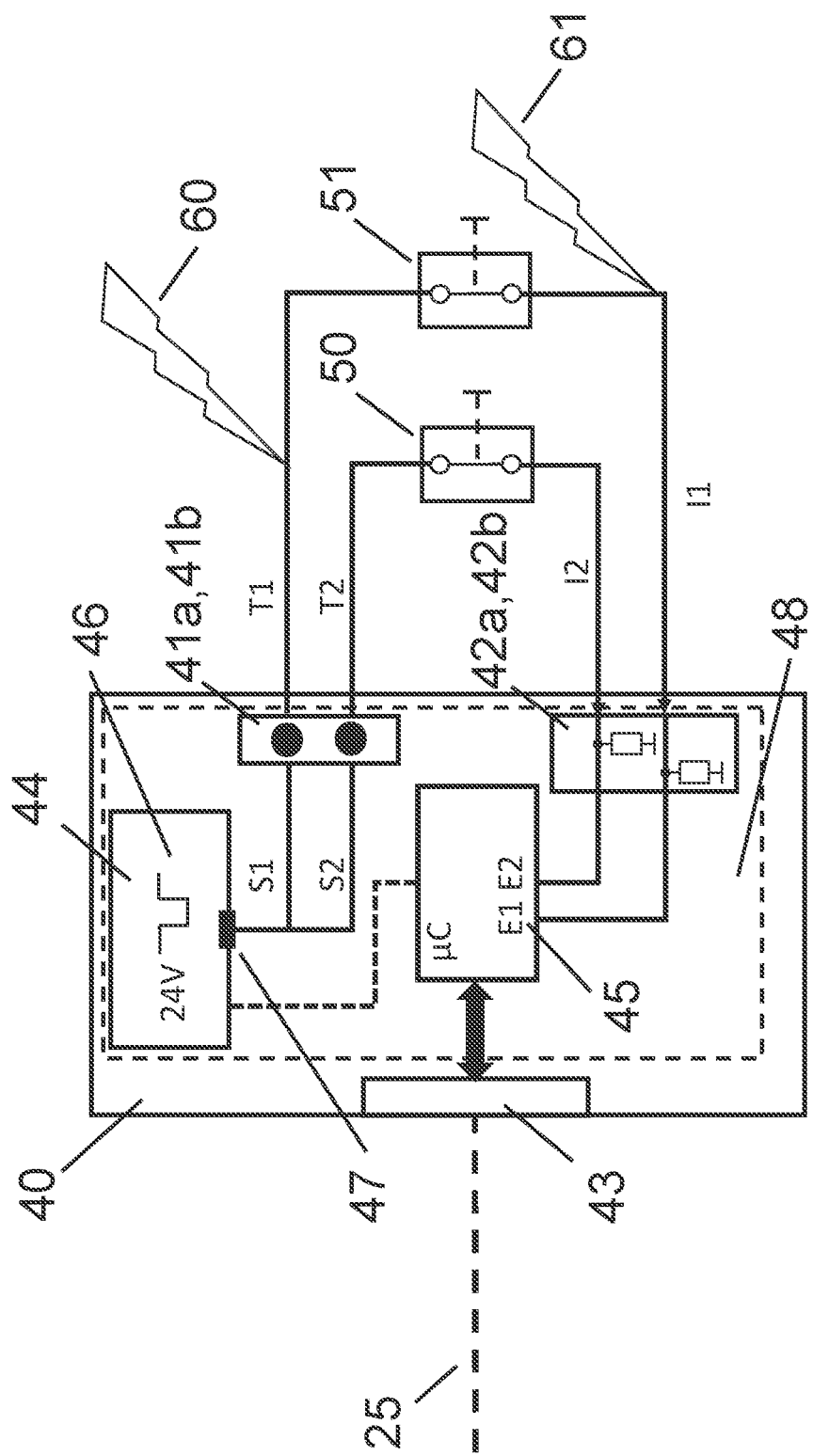
FIG. 2b shows a block diagram of a safe digital input module with a data interface for data connection with a sub bus and clock outputs and inputs for connecting sensors according to the conventional art in a second switching state under the influence of an interference voltage.

In FIG. 2b, the emergency stop switches (50, 51) are shown in the closed switch position. If there is a signal (S1, S2) at the safe digital inputs (42a, 42b), the µP checks whether this signal is correlated with the control of the clock generator (44) and the resulting clock signal. If a deviation is detected, the automation system must be transferred to the safe state and secured before it can be restarted.

The conventional art of a safe digital input module (40) with a safe digital input circuit (48) shown in FIGS. 2a and 2b has the disadvantage that due to the interconnection of the signal lines S1 and S2 at the clock generator output (47), an interference voltage (60) is detected at both inputs (42a, 42b) on only one of the lines leading from the clock outputs (41a, 41b) to the sensor or leading from the sensor to the inputs (42a, 42b). An analysis as to which of the lines has an interference voltage is not resolved.

Figure 3A:
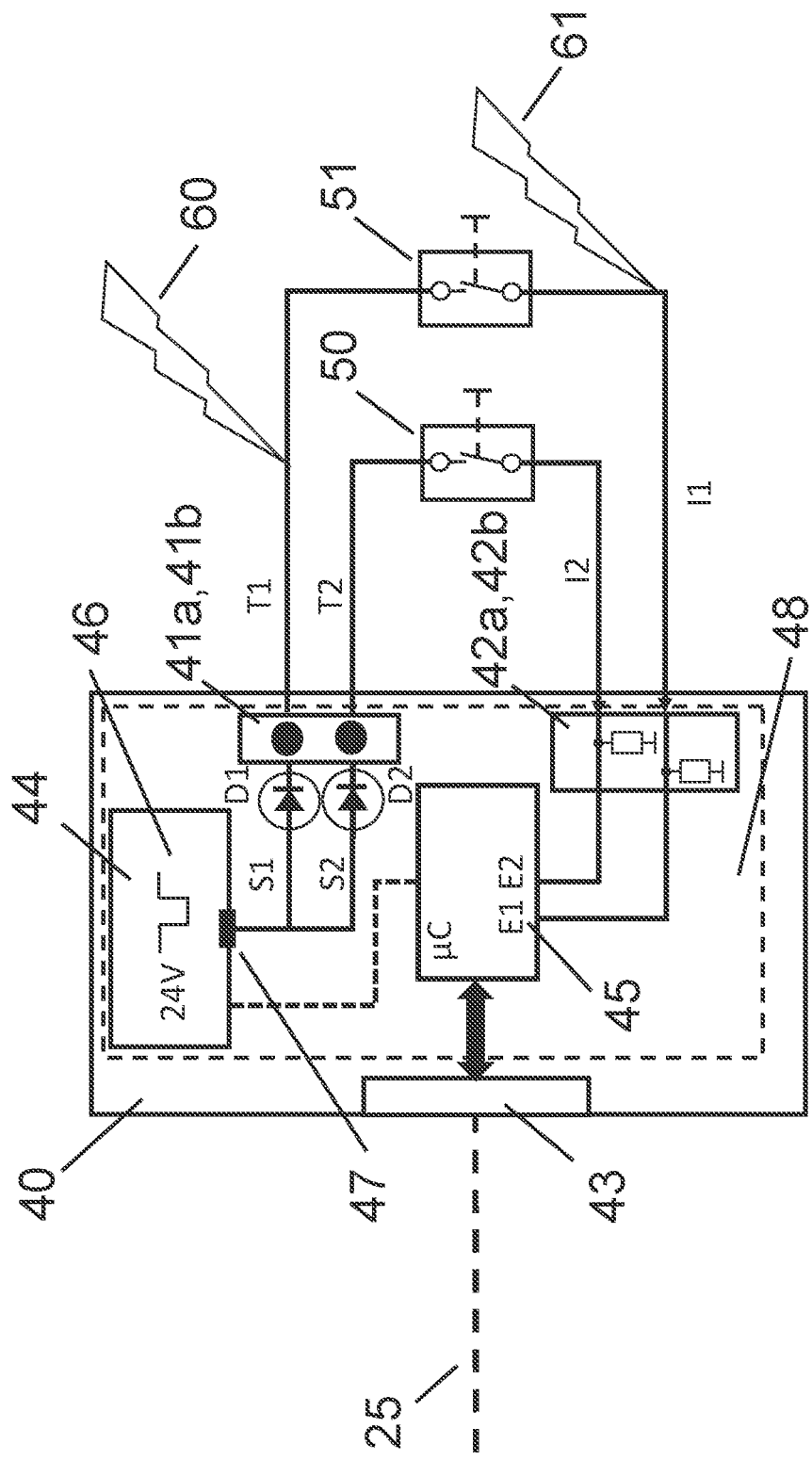
FIG. 3a shows a block diagram of a safe digital input module according to the invention with a data interface for data connection, for example with a sub bus and clock outputs and inputs for connecting sensors in a first switching state under the influence of an interference voltage with diodes connected in the signal lines.
Figure 3B:
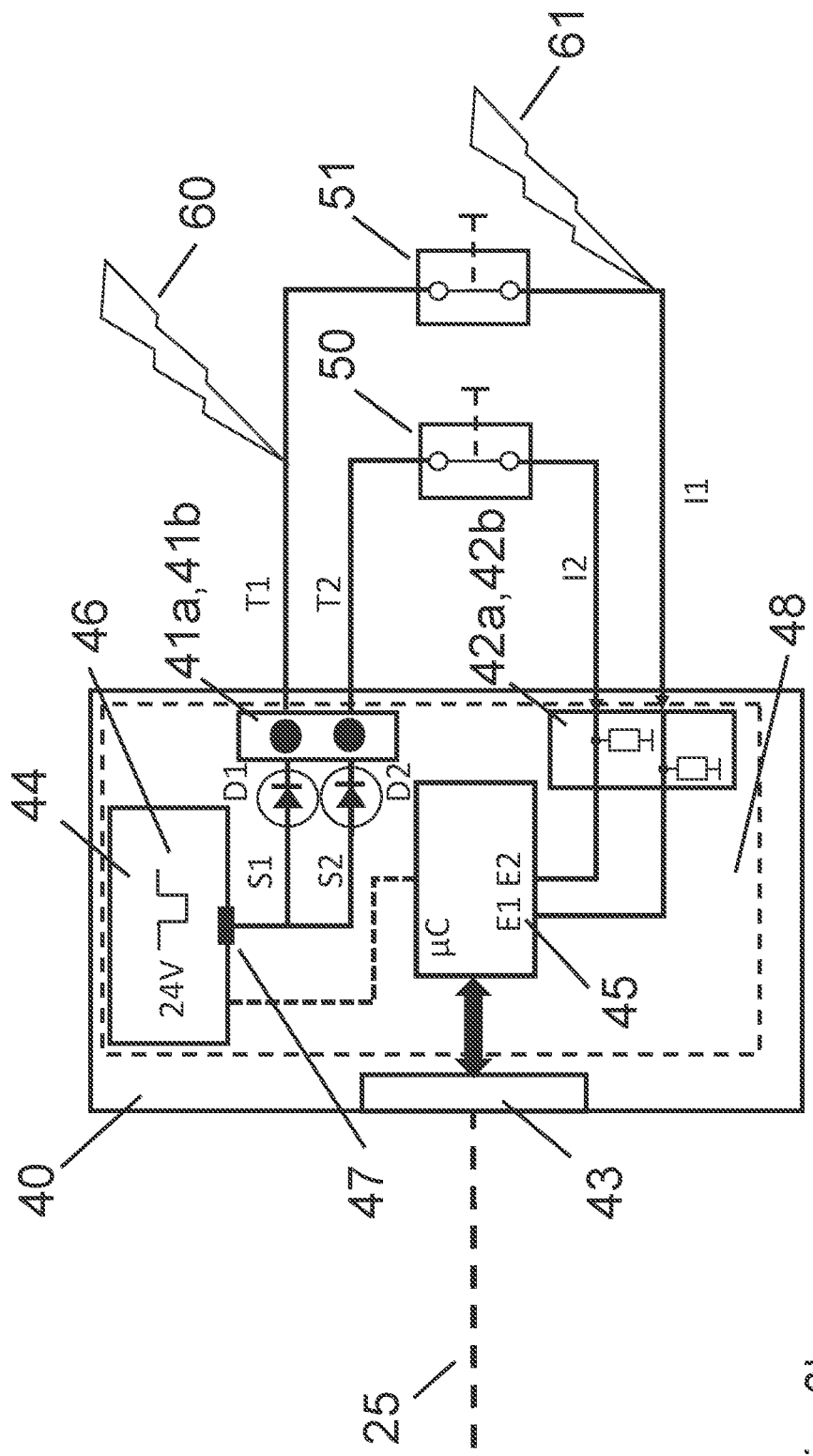
FIG. 3b shows a block diagram of the safe digital input module according to the invention with a data interface for data connection with, for example, a sub bus and clock outputs and inputs for connecting sensors in a second switching state under the influence of an interference voltage with diodes connected in the signal lines.

FIGS. 3a and 3b show a safe digital input module (40) with a safe digital input circuit in which a granular resolution of the line applied with an interference voltage (60) is possible. According to the invention, diodes (D1, D2) are to be used in the signal lines (S1, S2), which prevent an interference voltage from having a feedback effect on the respective other signal line via the clock generator output (47). The diodes (D1, D2) are connected in the signal lines in such a way that the clock signal (46) passes through the diodes (D1, D2) in the forward direction and blocks positive interference voltages (60) from the outside. Thus, a feedback effect of an interference voltage (60) on the respective other signal line (S1, S2) connected to the clock generator output (47) is no longer possible. An analysis as to which of the lines is affected by an interference voltage can now be resolved granularly.

A further advantage of the safe digital input module (40) according to the invention is that when using suppressor diodes (D1, D2), the clock generator output (47) and other electronic components are protected from excessive interference voltages at the clock outputs (41a, 41b). This can be the case, for example, with unintentional voltage pulses.

For example, the safe digital input circuit is integrated into a safe programmable logic controller (F-PLC). In addition to the safe digital input circuit, the F-PLC can also have safe output circuits with corresponding outputs for connecting actuators. In the event of interference voltages at the inputs of the safe digital input circuit, the F-PLC can switch the outputs to a safe state.

Further, the safe digital input circuit can be integrated into a frequency converter. This is particularly advantageous when drives are in safety-oriented contact with the inputs of the safe digital input circuit due to interference voltages and have to be switched off.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A safe digital input circuit comprising:
    a first input and a second input to receive a sensor signal;
    a clock generator to generate a clock signal;
    a first clock output and a second clock output set up to
        connect sensors for safely shutting down a system;

a first signal line connectable to a clock generator output of the clock generator to forward the clock signal to the first clock output;

a second signal line connectable to the clock generator output of the clock generator to forward the clock signal to the second clock output;

a first diode arranged in the first signal line between the clock generator output and the first clock output; and a second diode arranged in the second signal line between the clock generator output and the second clock output such that a feedback effect on the respective other signal line caused by an interference voltage is prevented, wherein the first diode and the second diode are Zener diodes, and wherein reverse voltages of the first diode and the second diode are greater than a voltage at the clock output.

2. The safe digital input circuit according to claim 1, wherein an anode of the first diode and an anode of the second diode are connected together to the clock generator output such that a current flow caused by a positive interference voltage applied to the clock output is blocked.

3. A safe digital input circuit comprising:
a first input and a second input to receive a sensor signal;
a clock generator to generate a clock signal;
a first clock output and a second clock output set up to connect sensors for safely shutting down a system;
a first signal line connectable to a clock generator output of the clock generator to forward the clock signal to the first clock output;
a second signal line connectable to the clock generator output of the clock generator to forward the clock signal to the second clock output;
a first diode arranged in the first signal line between the clock generator output and the first clock output; and
a second diode arranged in the second signal line between the clock generator output and the second clock output such that a feedback effect on the respective other signal line caused by an interference voltage is prevented,
wherein a cathode of the first diode is connected to the first clock output, and wherein a cathode of the second diode is connected to the second clock output.

4. The safe digital input circuit according to claim 1, further comprising a microcontroller to control the clock generator.

5. The safe digital input circuit according to claim 4, wherein the microcontroller is set up to detect an input signal based on the clock signal and to generate process data based on the input signal and to mark the process data as valid or invalid.

6. The safe digital input circuit according to claim 4, wherein the microcontroller is set up to output an error message to a data interface based on an interference signal.

7. A safe digital input circuit comprising:
a first input and a second input to receive a sensor signal;
a clock generator to generate a clock signal;
a first clock output and a second clock output set up to connect sensors for safely shutting down a system;
a first signal line connectable to a clock generator output of the clock generator to forward the clock signal to the first clock output;
a second signal line connectable to the clock generator output of the clock generator to forward the clock signal to the second clock output;
a first diode arranged in the first signal line between the clock generator output and the first clock output;
a second diode arranged in the second signal line between the clock generator output and the second clock output such that a feedback effect on the respective other signal line caused by an interference voltage is prevented; and
a microcontroller to control the clock generator,
wherein the microcontroller is set up to detect an interference signal based on a deviation from the clock signal.

8. A safe digital input module comprising the safe digital input circuit according to claim 1 to output process data or an error message to a sub bus.

9. A decentralized system comprising:
a fieldbus coupler; and
at least one safe digital input module according to claim 8,
wherein the safe digital input module is connected to the fieldbus coupler and is set up to communicate via a sub bus with the fieldbus coupler, and
wherein the fieldbus coupler is further set up to receive the process data or the error message and to output the process data or the error message to a fieldbus and an operating device.

10. An automation system comprising a controller and a decentralized system according to claim 9, wherein the controller is set up to receive the process data or the error message via the fieldbus, and wherein the controller is further set up to process the process data or the error message.

* * * * *